(12) United States Patent
Xiong (10) Patent No.: US 7,134,178 B2
(45) Date of Patent: Nov. 14, 2006

(54) MACHINE AND METHOD FOR ASSEMBLING ENCLOSURE COMPRISING SHELL

(75) Inventor: JianPing Xiong, Shenzhen (CN)

(73) Assignees: Hon Fu Jin Precision Industry (Shenzhen) Co., Ltd., Shenzhen (CN); Hon Hai Precision Industry Co., Ltd., Tu-Cheng (TW)

( * ) Notice: Subject to any disclaimer, the term of this patent is extended or adjusted under 35 U.S.C. 154(b) by 281 days.

(21) Appl. No.: 10/915,303

(22) Filed: Aug. 9, 2004

(65) Prior Publication Data
US 2005/0028355 A1 Feb. 10, 2005

(30) Foreign Application Priority Data
Aug. 8, 2003 (TW) .............................. 92121879 A (51) Int. Cl.
  *B23Q 3/00* (2006.01)
  *B23P 19/00* (2006.01)
(52) U.S. Cl. .............................. 29/467; 29/464; 29/729
(58) Field of Classification Search .................. 29/464, 29/468, 467, 466, 721, 722, 729, 700, 759, 29/760; 215/317
See application file for complete search history.

(56) References Cited

U.S. PATENT DOCUMENTS 4,180,178 A * 12/1979 Turner .......................... 220/281
4,361,134 A * 11/1982 Bowen ........................ 126/705

* cited by examiner

Primary Examiner—John C. Hong
(74) Attorney, Agent, or Firm—Wei Te Chung (57) ABSTRACT

A machine for assembling enclosure including a shell and a base includes a support base (12), a pair of first brackets (20) movably attached to opposite ends of the support base, and a pair of second brackets (40) pivotably attached to the first brackets respectively. A pair of first engagement assemblies (50) is arranged on opposite ends of the second bracket, each comprising a movable engagement part for engaging inside of the shell. A second engagement assembly (70) is arranged between the first engagement assemblies, and comprises a movable engagement plate for engaging outside of the shell. A controller (80) is provided for controlling the first and second brackets, the first and second engagement assemblies to act properly and sequentially, for engaging pins of the shell in corresponding holes of the base to form the enclosure.

21 Claims, 8 Drawing Sheets

MACHINE AND METHOD FOR ASSEMBLING ENCLOSURE COMPRISING SHELL

BACKGROUND OF THE INVENTION

1. Field of the Invention

The present invention relates to a machine and method for assembling an enclosure, and more particularly to a machine and a method for assembling an enclosure which comprises a shell.

2. Description of the Related Art

With the development of information technology, more and more electronic devices are produced to facilitate our home and office life. As we enjoy the convenience of the electronic devices, we begin to pay more and more attention to aesthetic and healthy issues relating to the electronic devices. The electronic devices are more attractive for beautiful ornamental design and less electromagnetic leaking.

An computer with colorful plastic enclosure has been popular in the past. However, rigidity of the plastic enclosure is bad, and the plastic itself is unable to prohibit electromagnetic leaking.

To address the aforesaid problem, a computer with metal enclosure has been brought to the market. The enclosure comprises a base, and a C-shaped shell attached to the base to form a sealed enclosure. The shell forms a plurality of pins on internal faces adjacent free edges thereof. A plurality of holes is defined in the base, for receiving the pins of the shell therein respectively. The enclosure must be sealingly assembled for an aesthetic issue and prohibiting electromagnetic leaking. It is obvious that manual work is inefficient and tiresome.

Thus, a machine for automatically assembling such an enclosure is desired.

SUMMARY OF THE INVENTION

Accordingly, an object of the present invention is to provide a machine which automatically assembles an enclosure.

A further object of the present invention is to provide a method for assembling an enclosure with the machine.

To achieve the above objects, a machine in accordance with the present invention comprises a support base, a pair of first brackets movably attached to opposite ends of the support base, and a pair of second brackets pivotably attached to the first brackets respectively. A pair of first engagement assemblies is arranged on opposite ends of the second bracket, each comprising a movable engagement part for engaging inside of the shell. A second engagement assembly is arranged between the first engagement assemblies, and comprises a movable engagement plate for engaging outside of the shell. A controller is provided for controlling the first brackets to move adjacent outside of the shell, sequentially controlling the engagement parts and the engagement plates to sandwich the shell therebetween, for engaging pins of the shell in corresponding holes of the base to form an enclosure.

Other objects, advantages and novel features of the present invention will be drawn from the following detailed description of a preferred embodiment of the present invention with the attached drawings, in which:

DETAILED DESCRIPTION OF THE INVENTION

Referring to FIGS. 1 to 8, an machine 10 is for assembling enclosure comprising a C-shaped shell 1000, and a base 2000. The shell 1000 integrally comprises a side panel 1001, a top panel 1003, and a bottom panel 1005. A pair of bent plates 1007 is bent generally perpendicularly from longitudinal edges of the top and bottom panels 1003, 1005 respectively, and extends toward each other. Each of the top and bottom panels 1003, 1005 defines an opening at a middle portion thereof. The shell 1000 is adapted for enclosing a top surface, a bottom surface, and a side surface of the base 2000. A plurality of pins 1009 is formed at internal faces of the bent plates 1007 respectively near free edges thereof. The base 2000 defines a plurality of holes (not labeled) in another side surface opposite to aforesaid side surface, corresponding to the pins 1009 of the shell 1000, see FIG. 7.

Figure 1:
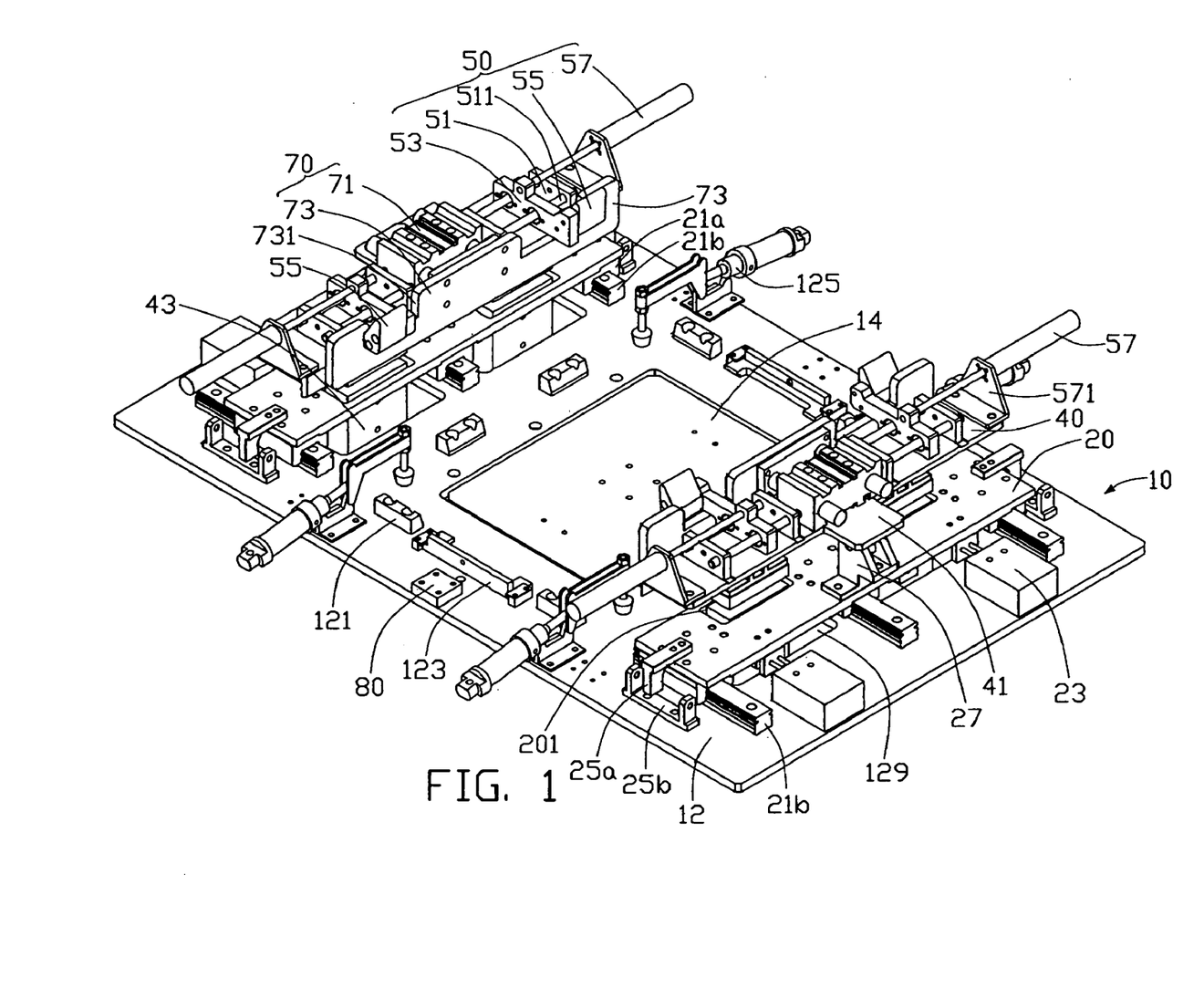
FIG. 1 is an isometric view of an machine in accordance with a preferred embodiment of the invention.
Figure 2:
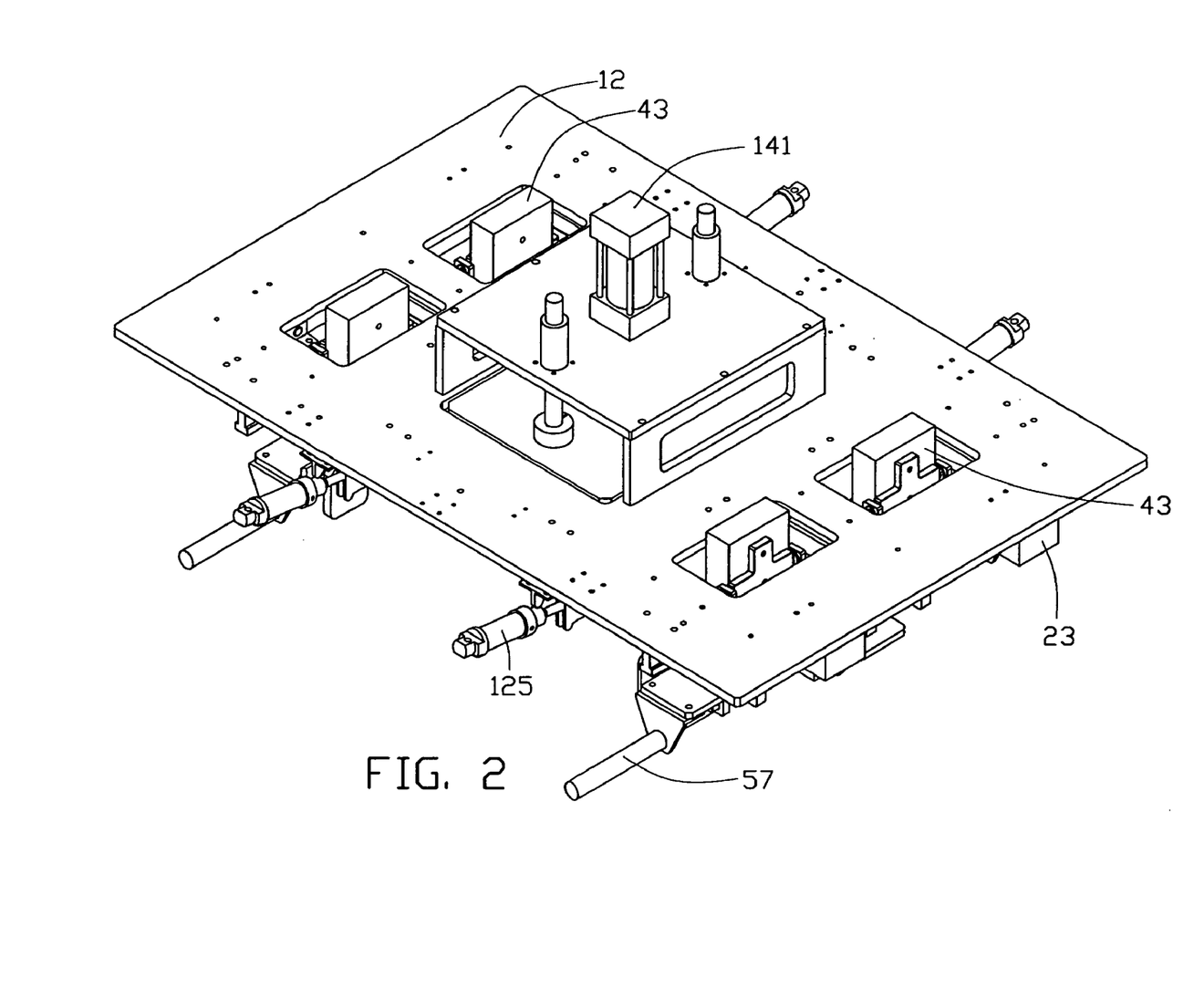
FIG. 2 is similar to FIG. 1, but viewed from another aspect.
Figure 3:
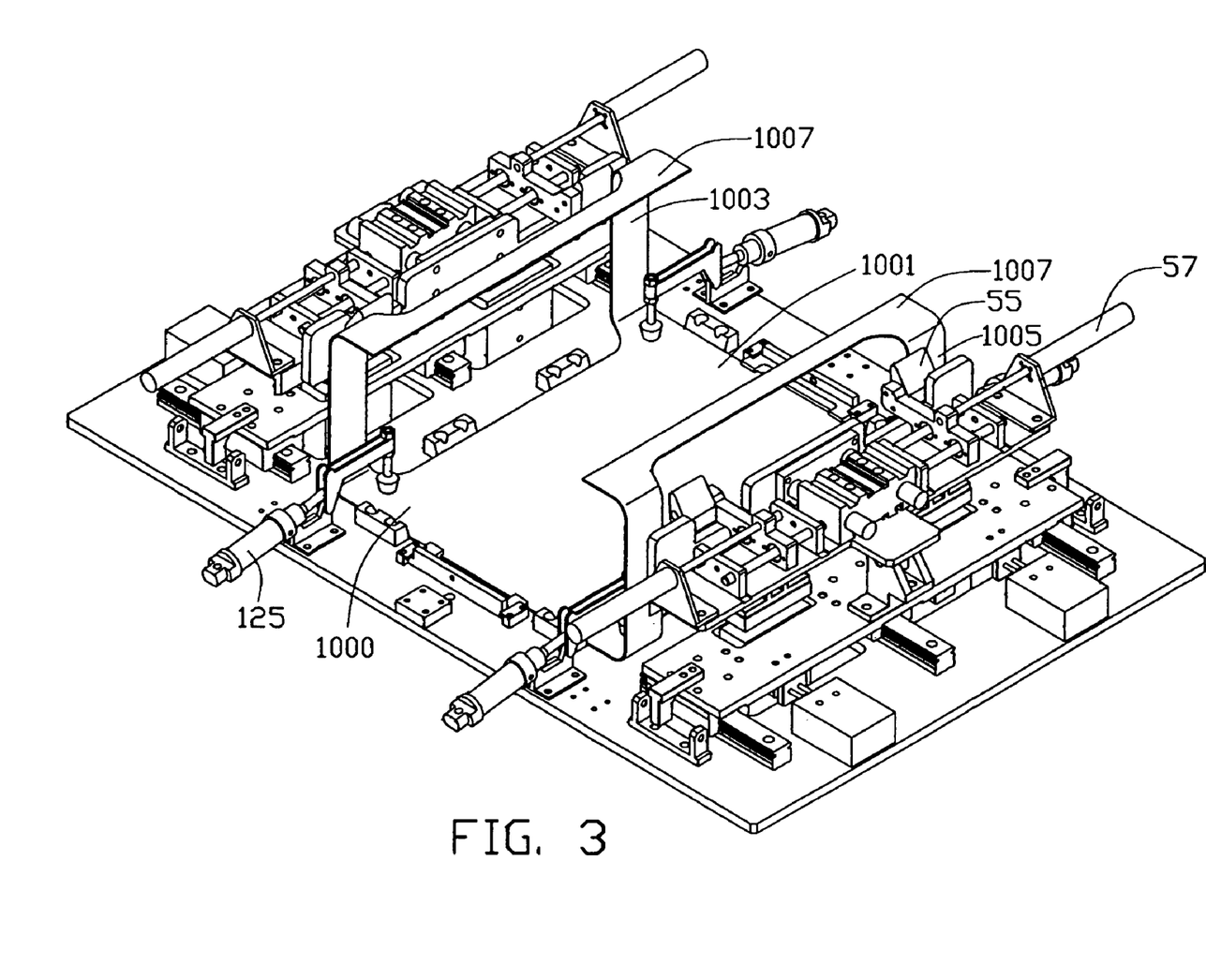
FIGS. 3 to 8 illuminate the steps of assembling an enclosure.
Figure 4:
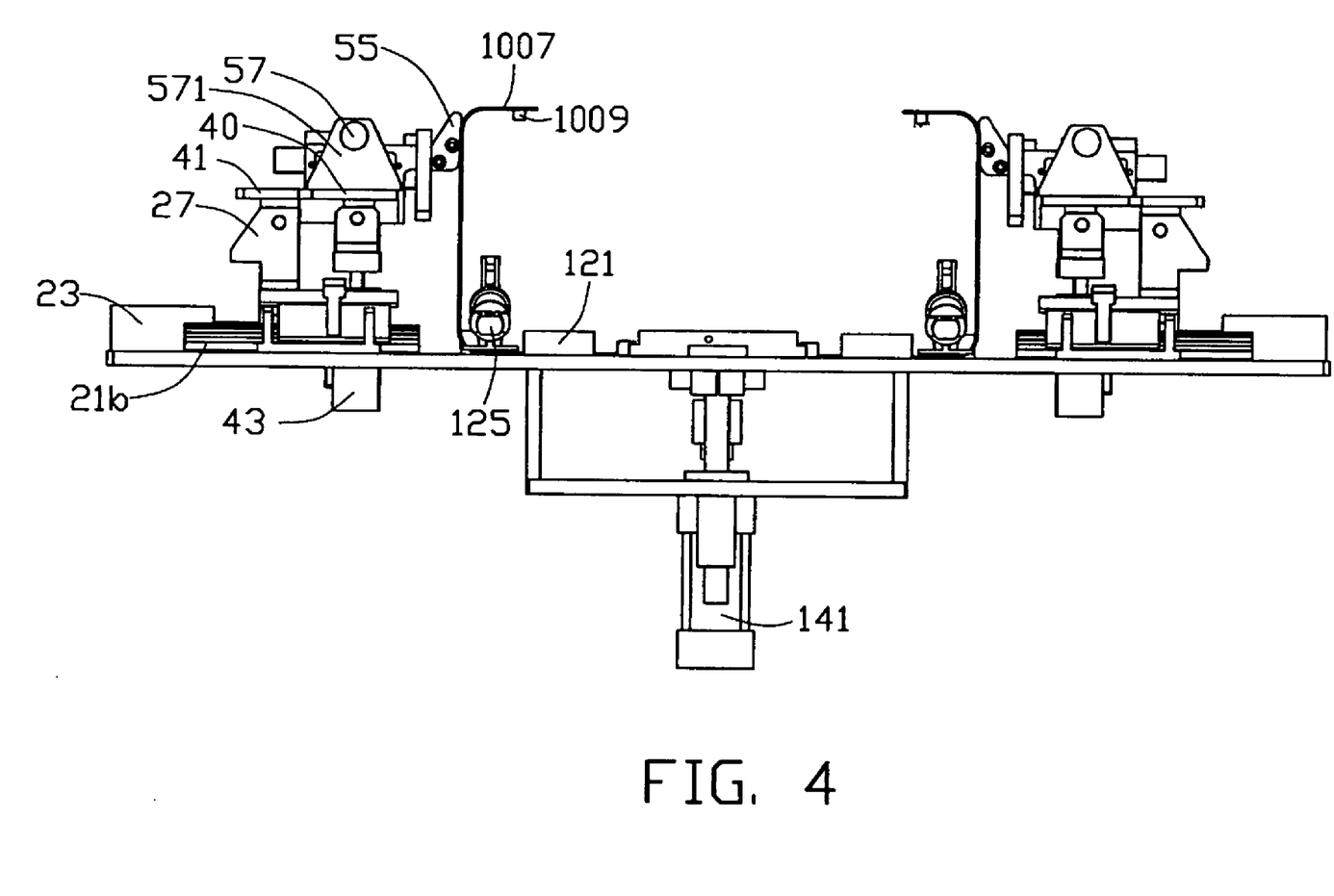
Figure 5:
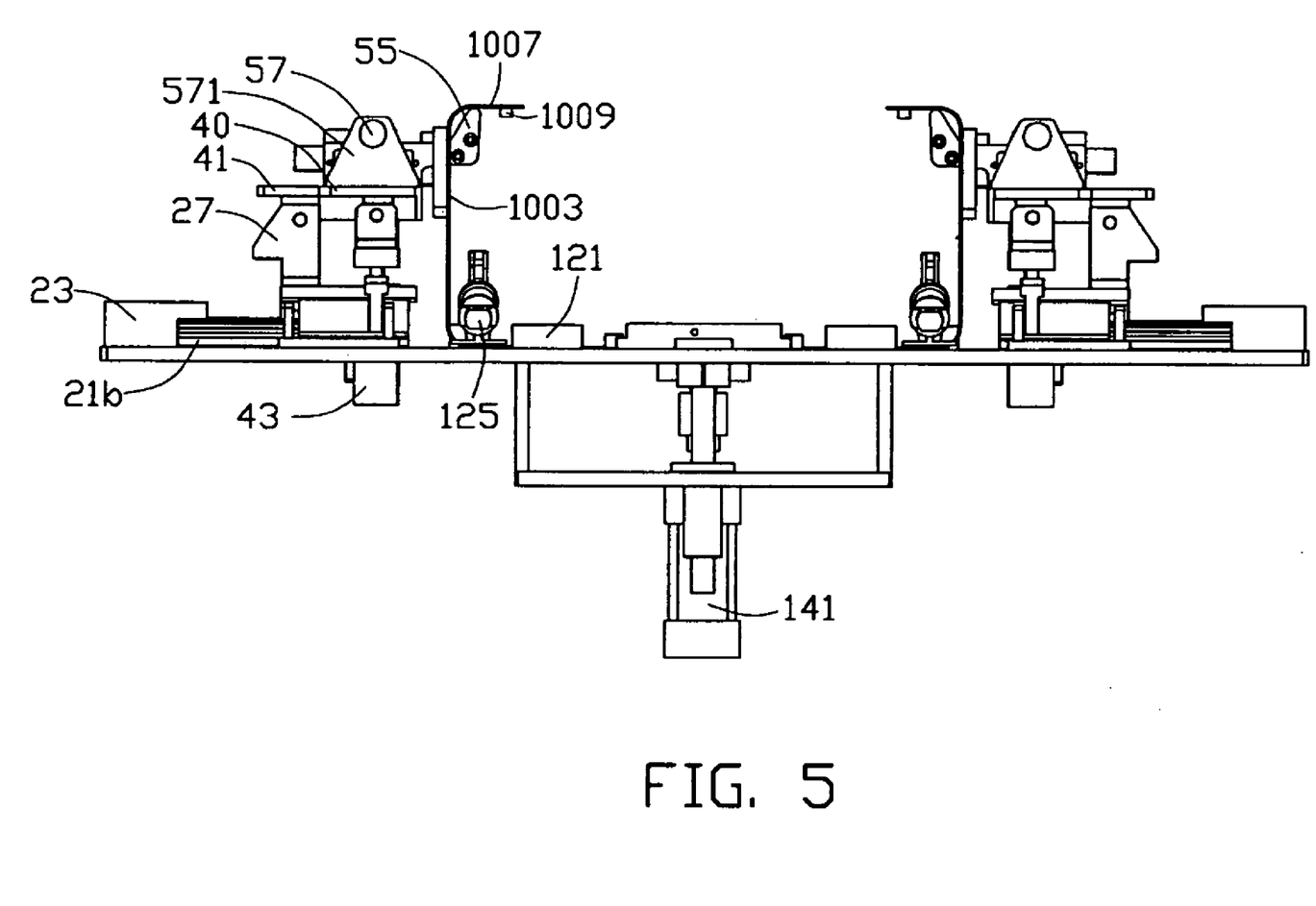

Referring particularly to FIGS. 1 and 2, the machine 10 comprises a support base 12. The support base 12 can have four legs depending from four corners of the support base 12 respectively. An elevator table 14 is provided in a central portion of the support base 12, for lifting assembled enclosure. The elevator table 14 is moved by a cylinder 141 attached below the support base 12. A plurality of positioning members 121, 123 is provided around the elevator table 14, for properly positioning the shell 1000. A plurality of fixing members 125 is arranged on the support base 12, for tightly attaching the shell 1000 to the support base 12 during shell 1000 being assembled with the base 2000. A pair of spaced apertures 129 is defined in the support base 12 adjacent each end thereof.

A pair of first brackets 20 is provided above corresponding apertures 129 respectively. Three spaced sliding blocks 21a is attached below each first bracket 20. Three spaced slideways 21b is formed on the support base 12, for mating with the sliding blocks 21a respectively. A pair of first cylinders 23 is provided proximate to each edge of the support base 12, for moving corresponding first bracket 20 along the slideways 21b. A pair of tabs 25a is attached to opposite ends of each first bracket 20. A pair of stoppers 25b is arranged parallel to side slideways 21b of the three slideways 21b proximate to longitudinal edges of the support base 12 respectively, corresponding to the tabs 25a, for preventing further movement of the first bracket 20. A pair of openings 201 is defined in each first bracket 20, corresponding to the openings 129 of the support base 12.

A second bracket 40 is pivotably arranged above each first bracket 20. A connecting part 41 is formed at a middle portion of a rearmost edge of the second bracket 40. A pivot pedestal 27 is arranged on corresponding first bracket 20, for pivotably connecting with the connecting part 41. A pair of second cylinders 43 extends through the openings 129, 201, for supporting the second bracket 40 thereon. The second cylinders 43 are attached to the support base 12. The second cylinders 43 are for pushing the first bracket 20 upwardly to cause outward rotation of the first bracket 20.

A pair of first engagement assemblies 50 is arranged on opposite ends of each second bracket 40. Each first engagement assembly 50 comprises a pair of supporting plates 51, a pair of parallel beams 511 connected between the supporting plates 51, a movable rack 53 defining a pair of through-holes for extension of the beams 511, and a third cylinder 57 for moving the movable rack 53 along the beams 511 between the supporting plates 51. An engagement part 55 is fixed to an end of the movable rack 53. The third cylinder 57 is supported with a supporting pedestal 571 on one end of the second bracket 40.

A second engagement assembly 70 is arranged between each pair of first engagement assemblies 50. The second engagement assembly 70 comprises a fourth cylinder 71 attached on a middle portion of the second bracket 40, and an engagement plate 73 attached to t he fourth cylinder 71. A pair of spaced cutouts 731 is defined in upper portion of the engagement plate 73, for extension of the engagement parts 55 of the first engagement assembly 70 therethrough.

A controller 80 is arranged on the support base 12. The controller 80 is a programmable logic controller, in which a controlling program is written for controlling the first, second, third and fourth cylinders 23, 43, 57, 71, and cylinder 141 of the elevator table 14. Physical linkages such as electrical signal lines are not shown between the controller 80 and aforementioned cylinders. Gas pipes and other components such as gas reservoir are not shown, either. However, a person skilled in the art will understand how to build necessary linkages connecting the controller and aforementioned cylinders.

In use of the machine, the shell 1000 is firstly positioned on the support base 12 with cooperation of the positioning members 121, 123 and the fixing members 125. The controller 80 then controls the first cylinders 23 to push the first brackets 20 toward the shell 1000, until the engagement parts 55 of the first engagement assemblies 50 enter inside the shell 1000 through the openings thereof, and the engagement plates 73 of the second engagement assemblies 70 engages the top and bottom panel 1003, 1005 respectively. The first cylinders 23 are stopped, sequentially the third cylinders 57 move in opposite directions. The movable racks 53 slide along the beams 5 11, until the engagement parts 55 engage inner surfaces of the top and bottom panels 1003, 1005, and the bent plates 1007 respectively, referring particularly to FIG. 5.

The third cylinders 57 are stopped. The second cylinders 43 are then activated to push the second brackets 40 upwardly. The second brackets 40 are driven to rotate apart from each other around the pivot pedestals 27 respectively, such that the bent plates 1007 are bent to form obtuse angles relative to the top and bottom panels 1003, 1005 respectively.

Figure 6:
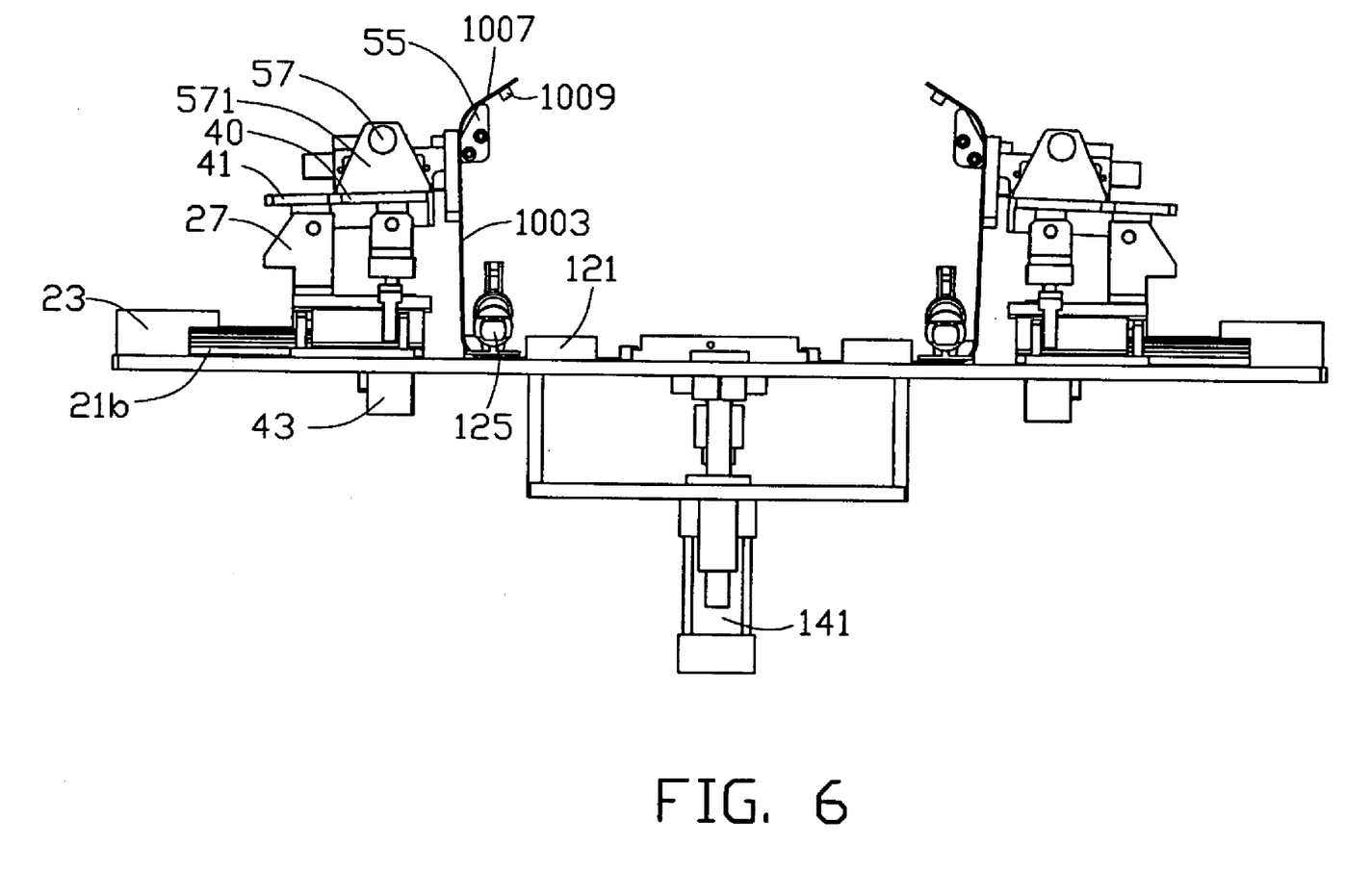
Figure 7:
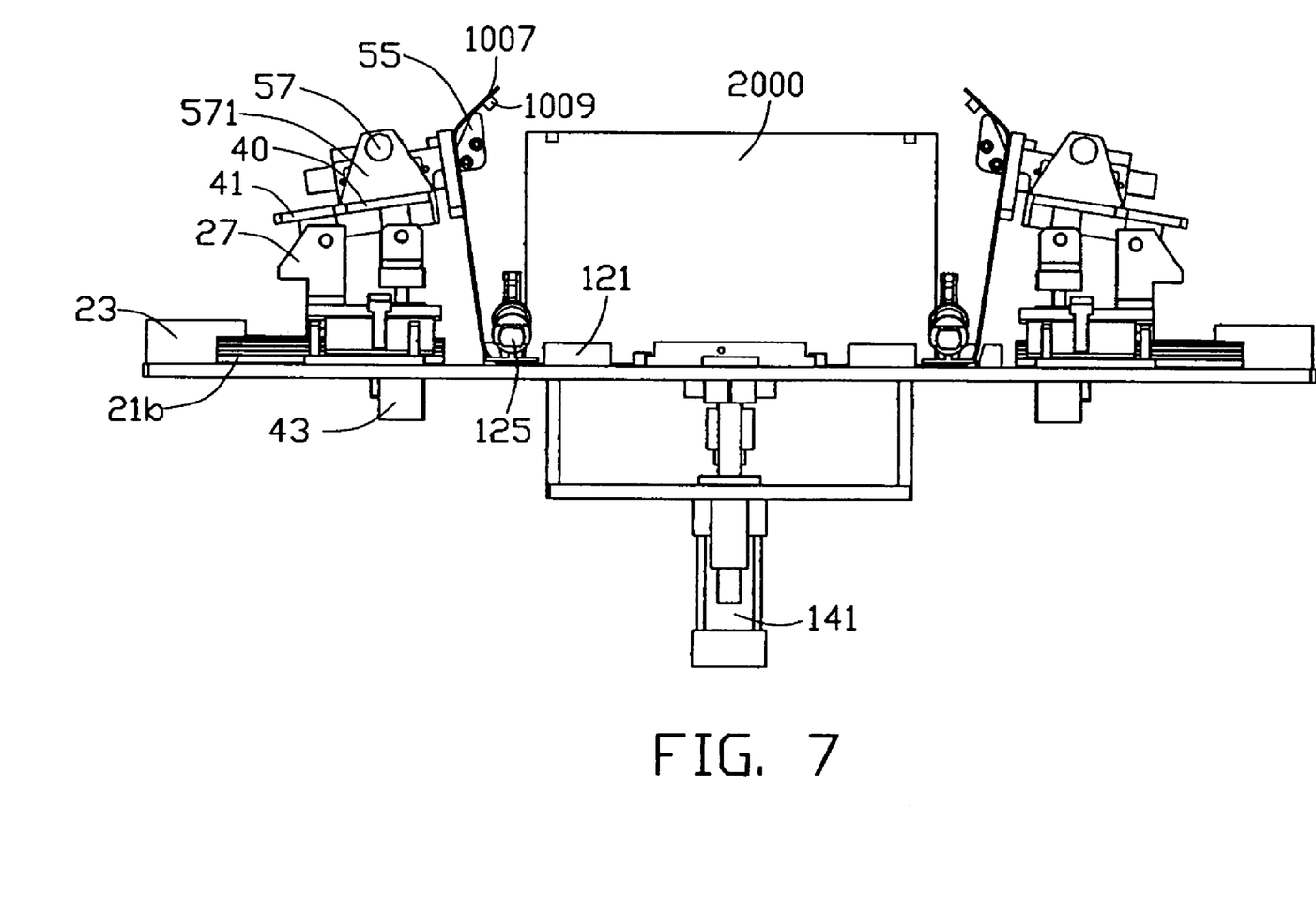
Figure 8:
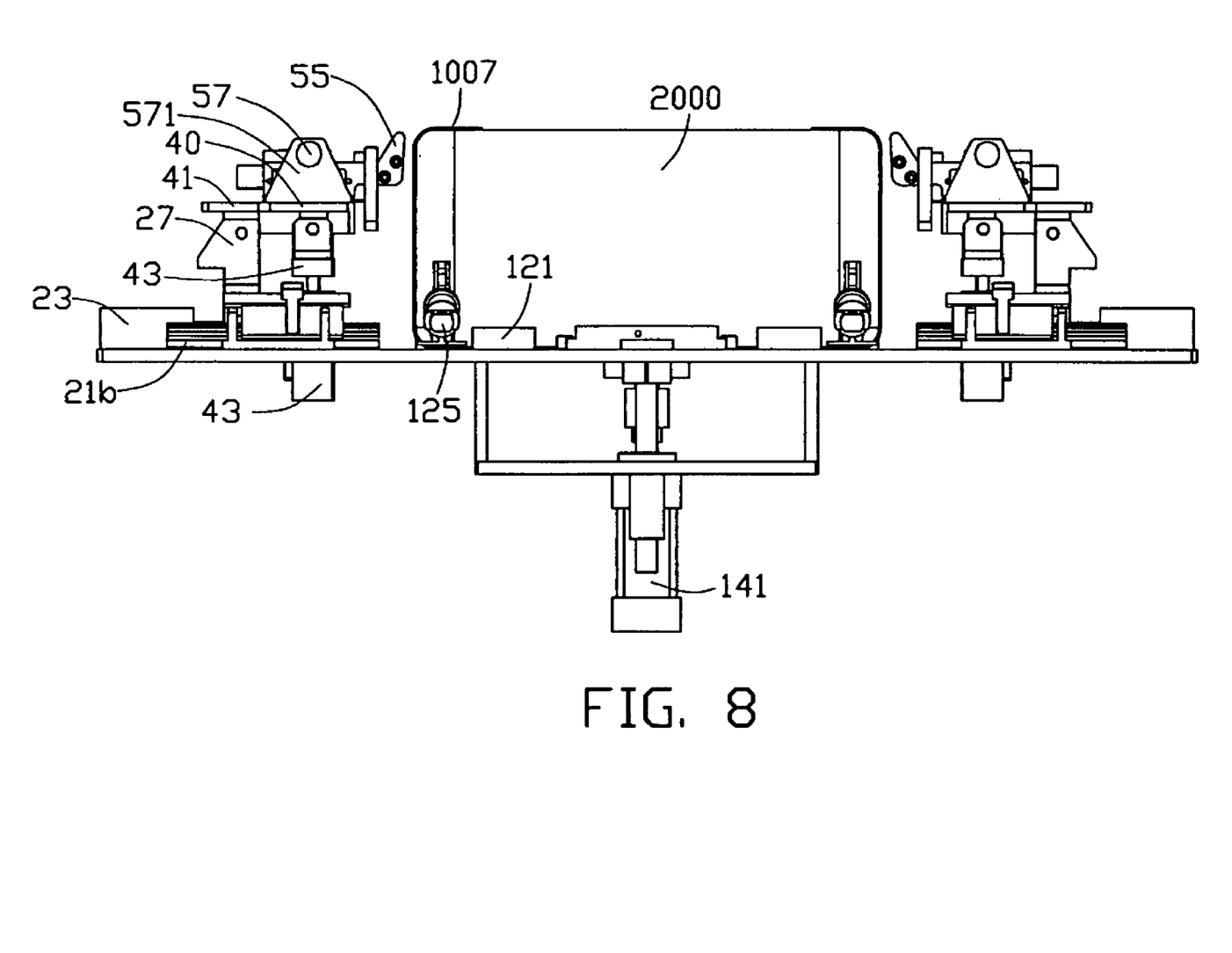

The second cylinders 43 are discontinued. Referring particularly to FIGS. 6 and 7, the first cylinders 23 retract to draw the top and bottom panels 1003, 1005 apart. The base 2000 is placed in the shell 1000. The first cylinders 23 are then controlled by the controller 80 to move the first brackets 20 toward the base 2000. When the shell 1000 is taken adjacent the base 2000, the first cylinders 23 cease to move the shell 1000, and the second cylinders 43 are controlled by the controller 80 to move downwardly, such that the second brackets 40 are driven to rotate toward the base 2000 respectively. The bent plates 1007 of the shell 1000 approaches said another side surface of the base 2000. The pins 1009 of the bent plates 1007 are generally lined with the holes of said another side surface, and are received in said holes respectively. The enclosure is assembled, comprising the shell 1000 and the base 2000.

The third cylinders 57 are then controlled to move the engagement pars 55 reversely to disengage with the shell 1000. It might happen that some pins 1009 of the shell 1000 accidentally fail to enter into corresponding holes of the base 2000. The fourth cylinders 71 are controlled to drive the engagement plates 73 of the second engagement assemblies 70 toward the base 2000, and the engagement plates 73 push the top and bottom panels 1003, 1005 toward the base 2000 to adjust said pins 1009 to line with and enter in corresponding holes.

The fourth cylinders 71 are then controlled to move the engagement plates 73 back to original position. The first brackets 20 are driven apart from the enclosure by the first cylinders 23. Finally, the elevator table 14 is pushed upwardly by the cylinder 141 to lift up the enclosure from the support base 12, for facilitating pickup.

While the present invention has been illustrated by the description of the preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A machine for assembling an enclosure comprising a shell and a base, comprising:
   a support base;
   at least one first bracket movably attached to one end of the support base;
   at least one second bracket pivotably arranged on the first bracket;
   at least one first engagement assembly arranged on the at least one second bracket, and comprising a movable engagement part, the engagement part adapted to engage inside of the shell;
   at least one second engagement assembly arranged on the at least one second bracket next to the at least one first engagement assembly, and comprising a movable engagement plate adapted to engage outside of the shell; and
   a controller;
   wherein the controller controls the at least one first bracket to move adjacent outside of the shell, sequentially controls the engagement part and the engagement plate to sandwich the shell therebetween.

2. The machine as claimed in claim 1, wherein a plurality of sliding blocks is attached below the at least one first bracket, a plurality of slideways is formed on the support base, corresponding to the sliding blocks respectively, and a cylinder is provided on the support base, and is controlled by the controller to move the at least one first bracket along the slideways.

3. The machine as claimed in claim 1, wherein a connecting part is formed at an edge of the at least one second bracket, a pivot pedestal is arranged on the at least one first bracket engaging with the connecting part, and a cylinder is attached below the at least one second bracket, and is controlled by the controller to move the at least one second bracket relative to the at least one first bracket.

4. The machine as claimed in claim 1, wherein the at least one engagement assembly further comprises a pair of supporting plates, a pair of beams connected between the supporting plates, a movable rack defining a pair of through-holes for extension of the beams, and a cylinder moving the movable rack along the beams.

5. The machine as claimed in claim 4, wherein the engagement part is attached to the movable rack.

6. The machine as claimed in claim 5, wherein a cutout is defined in the engagement plate of the at least one second engagement assembly, for extension of the engagement part of the at least one first engagement assembly.

7. The machine as claimed in claim 1, wherein a cylinder is connected with the engagement plate of the at least one second engagement assembly.

8. The machine as claimed in claim 1, wherein an elevator table is provided in a central portion of the base.

9. A method for assembling enclosure with a machine as claimed in claim 1, the method comprising the steps of:
  attaching the shell to the support base, the shell comprising two opposite panels;
  moving the at least one first bracket toward one of the panels such that the engagement plate of the at least one second engagement assembly engages an outside of said one of panels;
  moving the engagement part of the at least one first engagement assembly to engage an inside of said one of the panels;
  rotating the at least one second bracket relative to the first bracket;
  moving back the at least one first bracket from said one of the panels;
  receiving a base in the shell;
  moving the at least one first bracket toward said one of the top and bottom panels;
  rotating reversely the at least one second bracket relative to the first bracket such that the base is securely attached in the shell to form an enclosure;
  moving the engagement part from the inside of the shell; and
  moving back the at least one first bracket from said one of the panels.

10. The method as claimed in claim 9, further comprising steps: moving the engagement plate toward the shell, and moving back the engagement plate from the shell after the step: rotating reversely the at least one second bracket relative to the first bracket.

11. The method as claimed in claim 9, wherein the machine further comprises an elevator table in the support base.

12. The method as claimed in claim 11, further comprising step: moving the elevator table to lift up the enclosure.

13. The method as claimed in claim 9, wherein an opening is defined in said one of the panels, the engagement part of the at least one first engagement assembly is moved through the opening to engage the inside of said one of the panels.

14. The method as claimed in claim 9, wherein a plurality of pins is formed in the inside of the shell, and the base defines a plurality of holes receiving the pins therein thereby the base is securely attached in the shell.

15. A method of assembling a C-shaped shell and a rectangular base, comprising steps of:
  providing the C-shaped shell defining a cavity therein and further defining apertures in two opposite side walls therein, a pair of flanges formed on upper ends of said side walls, a first horizontal distance defined along a first direction between said pair of flanges, which is smaller than a second horizontal distance defined between the pair of two opposite side walls along said first direction;
  loading said shell to a table with the cavity in communication with an exterior via an opening defined between said pair of flanges;
  moving a pair of engagement parts respectively toward two side walls of the shell from two sides of said two side walls along said first direction, said engagement parts passing through the corresponding apertures and located under the corresponding flanges, respectively;
  moving said pair of engagement parts outwardly and upwardly, and thus outwardly deflecting the side walls by means of engagement between the engagement parts and the flanges so as to increase the first distance to be not less than a dimension of the base along the first direction;
  downwardly loading the base to the shell from the opening in a second direction perpendicular to said first direction; and
  resuming the flanges by withdrawing the engagement parts from the shell via a reverse procedure so that the flanges abut against the base and the shell retainably holds the base therein.

16. The method of claim 15, wherein the flanges includes locking devices latchably engaged with the base in said second direction perpendicular to said first direction.

17. The method of claim 15, wherein said second distance is larger than the dimension of the base.

18. The method of claim 15, further including a step of downward pressing against a bottom wall of the shell for securing said shell on the table before outwardly deflecting the side walls of the shell.

19. In combination:
  a machine providing table;
  a C-shaped shell located on the table, said shell defining a pair of opposite side walls connected by a bottom wall, a pair of flanges extending from top ends of the pair of side walls and toward each other, an aperture defined in each of said pair of opposite side walls;
  the machine further including a pressing device downwardly pressing against the bottom wall; and
  an engagement part extending through said aperture from an outer side of the corresponding side wall and further upwardly engaged with the corresponding flange, said engagement part being upwardly and outwardly moved to deflect the side wall outward so as to allow a base to be downwardly assembled to the shell without obstruction from the flange.

20. The combination as claimed in claim 19, wherein the flange defines a securing device to be latchably engaged with the base.

21. The combination as claimed in claim 19, wherein when assembled, a dimension of said base along a first direction is larger than a distance defined between two flanges along said first direction but smaller than that defined between the two side walls along said first direction.

* * * * *